United States Patent [19]
Gander et al.

[11] 3,791,890
[45] Feb. 12, 1974

[54] GRANUALR POLYKETONE PREPARATION

[75] Inventors: Frederick W. Gander, Kennet Square, Pa.; William D. Garlington, Wilmington, Del.

[73] Assignee: E. I. du Pont de Nemours and Company, Wilmington, Del.

[22] Filed: Feb. 18, 1972

[21] Appl. No.: 227,613

[52] U.S. Cl. .................................................. 260/61
[51] Int. Cl. ........................................... C08g 23/00
[58] Field of Search ....................................... 260/61

[56] References Cited
UNITED STATES PATENTS

| | | | |
|---|---|---|---|
| 2,521,288 | 9/1950 | Evers | 260/45 |
| 3,065,205 | 11/1962 | Bonner | 260/63 |
| 3,385,825 | 5/1968 | Goodman et al. | 260/61 |
| 3,516,966 | 6/1970 | Berr et al. | 260/47 |
| 3,660,317 | 5/1972 | Masatsugu | 260/2.2 C |
| 3,208,994 | 9/1965 | Flodin | 260/209 |

*Primary Examiner*—Melvin Goldstein
*Attorney, Agent, or Firm*—Donald W. Huntley

[57] ABSTRACT

An improvement in the preparation of polyketones by Friedel-Crafts synthesis, wherein the reaction mixture is dispersed into a heated fluid, prior to coagulation of the polyketone, to form a granular product.

6 Claims, No Drawings

GRANULAR POLYKETONE PREPARATION

BACKGROUND OF THE INVENTION

Certain aromatic polyketones recently made available in the art exhibit a wide variety of physical properties that make them particularly attractive for certain insulating applications. Such polyketones are described, for example, in U.S. Pat. Nos. 3,065,205, 3,441,538 and 3,442,857.

One difficulty previously encountered in the preparation of polymers of this type was the relatively intractable nature of the initial polymer-catalyst complex upon formation. Previous attempts to deal with the generally intractable state of the reaction product have included polymerizing the monomers in the presence of a soluble solid material to permit removing the product from the reaction medium and subsequently separating the soluble material by leaching. However, none of these prior techniques has proved entirely satisfactory.

SUMMARY OF THE INVENTION

The instant invention provides an improvement that permits the preparation of polyketones in granular form.

Specifically, the invention relates to an improvement in the process for the preparation of polyketone compositions by bringing into contact, in an organic medium, diphenyl ether and a stoichiometric amount of at least one compound selected from terephthalic and isophthalic acid chlorides with aluminum chloride catalyst and subsequently separating the polyketone from the resulting polymer-catalyst complex, which improvement comprises completing the reaction by dispersing the reaction mixture into a fluid maintained at a temperature of about from 50° to 130°C., the reaction mixture being dispersed a. prior to coagulation of the mixture; and
b. after the elapse of at least 25 percent of the time period between the completion of the combination of reactants, including catalyst, and coagulation of the reaction mixture.

DETAILED DESCRIPTION OF THE INVENTION

Figure 1:
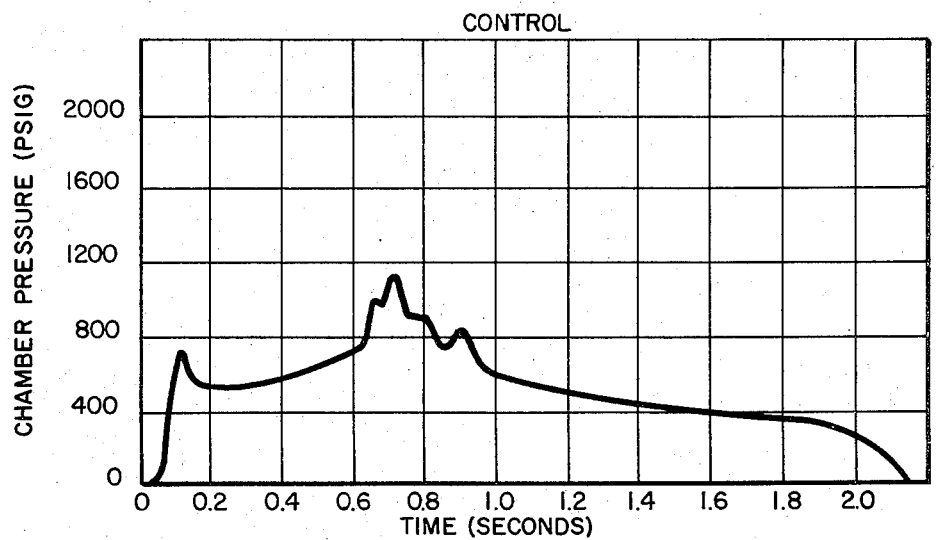
Figure 2:
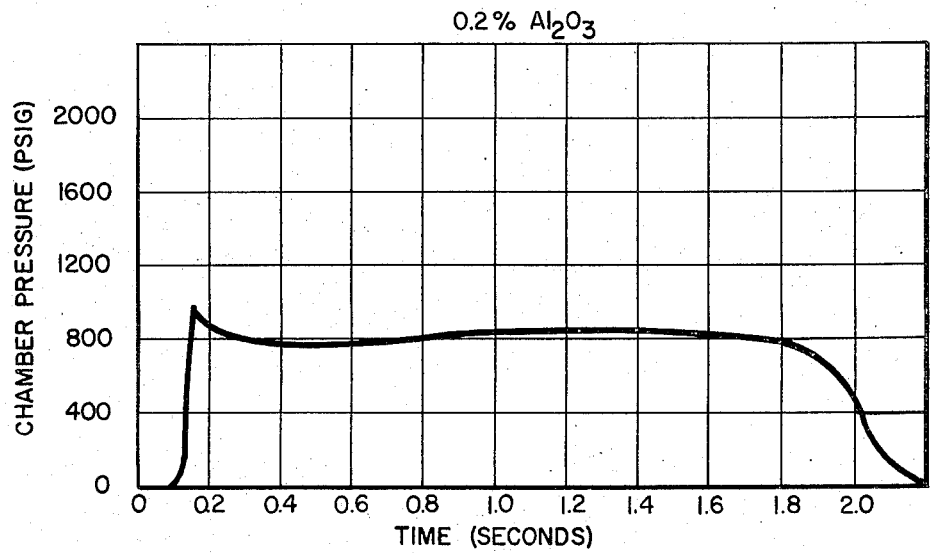
Figure 3:
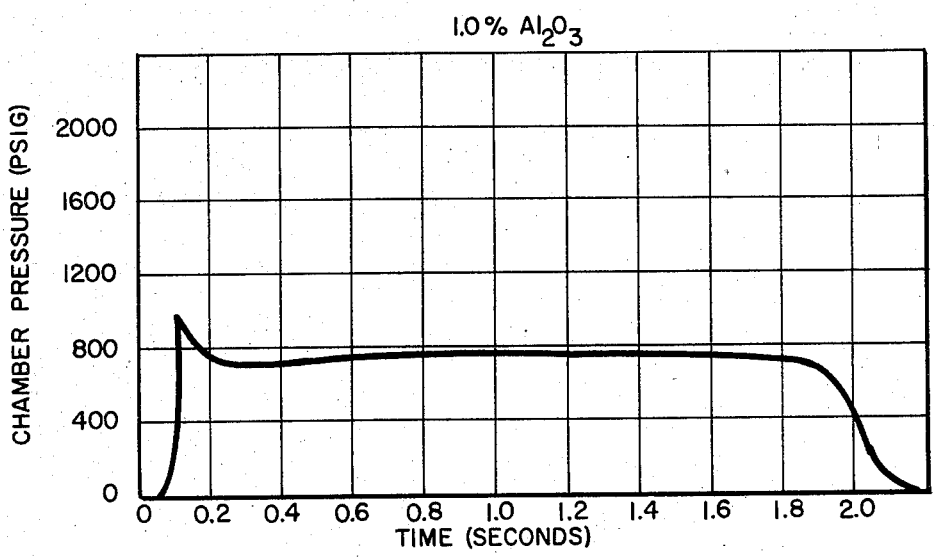
Figure 4:
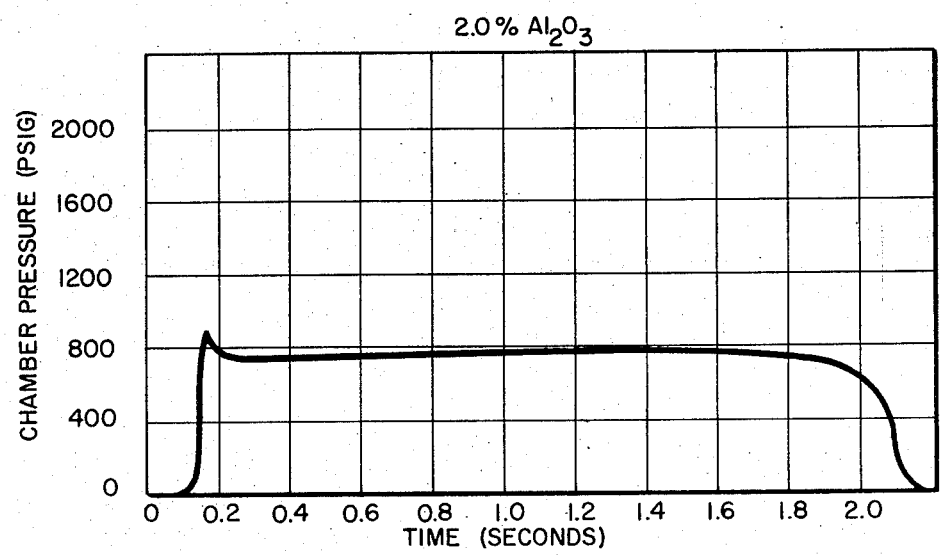

The copolyketones prepared by the process of the instant invention are among those described in U. S. Pat. Nos. 3,065,205, 3,441,538 and 3,442,857. The specific copolyketones to which the present invention relates have recurring units of the following structural formula:

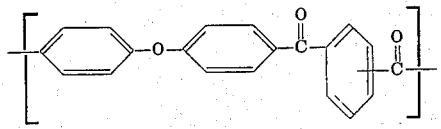

wherein the 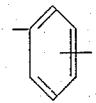 moiety is 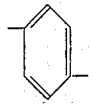

(T) and/or 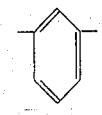

The T:I ratio preferably varies from 90:10 to 30:70.

The preparation of the polyketones is begun using reactants and solvents of the type conventionally used in the art. Particularly useful solvents include o-dichlorobenzene, sym-tetrachloroethane, methylene chloride, dichloroethane and mixtures thereof. The aluminum chloride Friedel-Crafts catalyst is generally added over a period of time as the last component of the reaction mixture. It is understood, of course, that the addition rate of the catalyst is adjusted so that the entire amount of catalyst is incorporated prior to coagulation of the reaction mixture.

The reaction is generally begun at a first, lower temperature. The initial lower reaction temperature is desirable to maintain control over the rate of the reaction, so that coagulation of the formed copolyketone does not occur before dispersion can be effected. A first reaction temperature of about from −15° to 0°C. has been found to be particularly effective. The term coagulation, as used in reference to the present invention, is that point at which the gelatinous polymer complex begins to separate from the reaction mixture and coat the reaction vessel walls.

In accordance with the instant process, the reaction mixture is dispersed into a fluid medium maintained at a temperature of at least about 50°C., and preferably at least about 70°C. In general, the fluid into which the reaction mixture is dispersed should be maintained at a temperature below 130°C. and preferably below 120°C. to minimize deleterious side reactions. Accordingly, the fluid into which the reaction mixture is dispersed should be maintained at a temperature of about from 50° to 130°C., and preferably about from 70° to 120°C. A dispersing fluid temperature of at least about 100°C. is especially preferred, particularly when a gaseous fluid is used.

The fluid medium into which the reaction mixture is dispersed can be any gas or liquid in which the copolyketone formed is substantially unreactive at the temperature employed in the present process. Accordingly, the dispersing medium can comprise air or other gases such as helium, nitrogen and oxygen or liquids including those conventionally used as solvent systems in the preparation of these polyketones. Liquids for the dispersing medium can be the same as the initial reaction solvent or different. Preferred liquids include aliphatic and cycloaliphatic saturated hydrocarbons, such as nonane, Nujol, decalin and decane; chlorinated aliphatic and cycloaliphatic saturated hydrocarbons, such as tetrachloroethane, and dichlorocyclohexane, chlorinated aromatic hydrocarbons such as chlorobenzene, o-dichlorobenzene and p-dichlorobenzene.

A critical element of the process of the instant invention is that the reaction mixture be abruptly dispersed into the higher temperature fluid. Accordingly, the volume of the high temperature fluid should comprise at least 200 percent of the initial volume of the reaction mixture. The particular method of dispersing can vary widely depending on the reaction procedure. In a batch process, for example, the entire reaction mixture, before coagulation, can be poured into a second vessel containing the high temperature liquid and therein abruptly dispersed, for example, by a high-speed stirrer. It is particularly preferred that the reaction mixture be transferred as a thin stream near the stirrer so as to prevent agglomeration on the walls of the second vessel. Alternatively, in a continuous reaction process, the reaction mixture can be sprayed into air, gas or liquid maintained at the required temperature increment. Another method of effecting the process of the instant invention in a continuous operation involves introducing the reaction mixture into a stream of heated solvent at a point in the flow of the reaction mixture before that at which coagulation of the polymer would normally occur.

It has been found necessary to preheat the fluid into which the reaction mixture is dispersed, to effect a rise in temperature of the reaction mixture as abrupt as the dispersing itself. Accordingly, it would be unacceptable to inject heated dispersing liquid into the reaction system, or to combine the reaction mixture and dispersing fluid and subsequently heat the combined fluids to the required temperature, since this would result in a gradual, rather than abrupt, temperature rise. While the mechanism of the instant process is not fully understood, it is believed that dispersion into a heated fluid in accordance with the instant invention segregates the particles of copolymer that are beginning to form in the initial reaction mixture, facilitates the completion of the reaction by elevated temperatures and, at the same time, the dispersion prevents the agglomeration of these particles into the gelatinous mass usually resulting from this type of polymer preparation.

The improvement offered by the present invention greatly facilitates the production of polyketones of this type, since the resulting polymer is obtained in granular form. The production of granular particles by this process eliminates the need for breaking up the rubbery, gelatinous mass heretofore generally formed in the preparation of these polyketones, thus facilitating the purification of the polymer after formation.

If reaction procedures are carried out in accordance with the following examples, the indicated results will be obtained.

EXAMPLE 1

To a mixture of 11.35 grams of diphenyl ether, 10.81 grams of terephthaloyl chloride and 2.72 grams of isophthaloyl chloride in a reaction vessel containing 80 milliliters of o-dichlorobenzene solvent maintained at a temperature of 0°C., is added 26.67 grams of anhydrous aluminum chloride over a period of about 15 minutes. The reaction is allowed to proceed until the elapse of about 14 minutes, which is 78 percent of the time between completion of the catalyst addition and coagulation. The mixture is thereupon poured as a thin stream into a second reaction vessel at a point near the center of the vessel, with rapid stirring. The second vessel contains 250 milliliters of dichlorobenzene having an initial temperature of about 82°C. The reaction is allowed to come to completion over a 1 hour period and a uniform, granular polyketone-catalyst complex is obtained. The granules are readily purified by filtering off the dichlorobenzene, washing several times with absolute ethyl alcohol and vacuum drying at 50°C.

EXAMPLE 2

The same initial reaction mixture used in Example 1 is prepared, and, prior to the start of coagulation of the polymer from the reaction mixture, the mixture is dispersed by spraying into an air stream heated to a temperature of 100°C. A similar, granular copolyketone product is obtained.

EXAMPLE 3

All glass apparatus used in this example is dried overnight in a 120° to 130°C. oven and cooled in a dry box. Dry nitrogen is swept through the apparatus during assembly and continued until the reaction procedure is completed. Material transfers and all weighings are done in a dry box.

To a tared 1-liter reaction flask equipped with a stirrer, thermometer, and gas inlet for nitrogen sweep, is added approximately 71 grams (0.35 mole) of a distilled 70:30 mixture of terephthaloyl and isophthaloyl chlorides, and the charged flask is weighed to determine the exact amount of mixed acid chlorides used.

An amount of distilled diphenyl ether (approximately 59.5 grams) calculated to be stoichiometrically equivalent to the amount of mixed acid halides used, is weighed into a tared dropping funnel.

Anhydrous aluminum chloride (139 grams) is screened through a 40-mesh stainless steel screen in a dry box and is then weighed into a tared glass-stopped flask.

The reaction flask is set in place, the nitrogen sweep is begun, the agitator shaft is connected to a stirring motor, the dropping funnel is placed on the flask, the diphenyl ether is added to the flask, and 350 ml. of distilled ortho-dichlorobenzene is added to the reaction flask through the dropping funnel. The charge is stirred to dissolve the monomers. The stirred charge is cooled to about from −5° to −10°C. by using a bath of water, ice and acetone.

The dropping funnel is removed from the reaction flask and replaced with an inclined glass screw tubular conveyor to which is attached the flask containing the weighed quantity of aluminum chloride. The aluminum chloride is added to the reaction flask through the screw conveyor by manually turning it; the rate of addition is adjusted to maintain the reaction solution temperature at −5° ± 1°C. and to complete the addition in about 1.5 hrs.

When the aluminum chloride addition is complete, the screw conveyor is replaced by a fitting attached to a low vacuum to remove hydrogen chloride gas. The vacuum is applied gradually to minimize initial foaming. The reaction mixture is stirred under vacuum for 15 min. The vacuum is released by venting with nitrogen and agitation is stopped, while keeping the cooling bath in place.

The vacuum fitting in the reaction flask is replaced by a transfer tube of 0.25 in. polyethylene tubing which dips to the bottom of the reaction flask and has a 0.125 in. (inside diameter) polyethylene connector fused into it as its discharge end. The discharge end of the tubing is placed into a jacketed 3-liter resin kettle which has been equipped with a stirrer, charged with 1,250 cc. of distilled orthodichlorobenzene and preheated to 100°C. by passing steam through the jacket. Three psig. nitrogen pressure is applied to the reaction flask in order to force the reaction mixture through the transfer tube and jet it into the hot dichlorobenzene. The expected polymer-catalyst complex precipitates as a slurry of small particles. Steam heating and stirring is continued for 0.5 hr. after transfer to the resin kettle is completed.

The slurry is cooled to room temperature by passing water through the jacket of the kettle. Stirring is stopped, and the dichlorobenzene is removed by siphoning through a sintered glass tube. One liter of denatured ethanol is rapidly added to the polymer in the kettle, and stirring is resumed. The ensuing reaction of ethanol with the polymercatalyst complex causes the temperature to rise to 40°–45°C. The kettle is equipped with a reflux condenser, steam is again passed through the jacket, and the slurry is stirred and heated under reflux for 0.5 hr. The slurry is again cooled, and the polymer collected by filtration.

The granular polymer is washed by repeatedly slurrying in denatured ethanol containing hydrogen chloride and filtering, until a filtrate diluted 50 percent with water and adjusted to pH 9 with dilute ammonium hydroxide gives no precipitate of aluminum hydroxide. The polymer is further washed by repeatedly slurrying in denatured ethanol (containing no hydrogen chloride) until the filtrate gives only a weak test for chloride ion with silver nitrate solution. The polymer, identified as the expected polyketone, is in a uniform, granular configuration, and is dried in a vacuum oven at 120° to 130°C.

We claim:

1. In a process for the preparation of polyketone compositions in granular form by bringing into contact, in an organic medium, diphenyl ether and a stoichiometric amount of at least one compound selected from terephthalic and isophthalic acid chlorides with aluminum chloride catalyst and subsequently separating the polyketone from the resulting polymercatalyst complex, the improvement which comprises completing the reaction by abruptly dispersing the reaction mixture into a higher temperature fluid maintained at a temperature of about from 50° to 130°C., to effect an abrupt rise in temperature, the volume of said fluid being at least 200 percent of the initial volume of the reaction mixture, the reaction mixture being dispersed
   a. prior to coagulation of the mixture; and
   b. after the elapse of at least 25 percent of the time period between the completion of the combination of reactants, including catalyst, and coagulation of the reaction mixture.

2. A process of claim 1 wherein the fluid is a liquid solvent for the monomers used in the polyketone synthesis.

3. A process of claim 1 wherein the fluid is a gas.

4. A process of claim 3 wherein the fluid consists essentially of air.

5. A process of claim 1 wherein the temperature of the fluid is maintained at about from 70° to 120°C.

6. A process of claim 4 wherein the temperature of the fluid is maintained at a temperature of at least 100°C.

* * * * *

UNITED STATES PATENT OFFICE
CERTIFICATE OF CORRECTION

Patent No. 3,791,890                    Dated February 12, 1974

Inventor(s)  Frederick W. Gander et al.

It is certified that error appears in the above-identified patent and that said Letters Patent are hereby corrected as shown below:

Column 1, about line 63, -- (1) -- should follow the structural formula.

Delete sheets 1 and 2 of the patent.

Signed and sealed this 8th day of October 1974.

(SEAL)
Attest:

McCOY M. GIBSON JR.                     C. MARSHALL DANN
Attesting Officer                       Commissioner of Patents